US005191376A

United States Patent [19]

Hayashi

[11] Patent Number: 5,191,376

[45] Date of Patent: Mar. 2, 1993

[54] OPTICAL UNIT

[75] Inventor: Tatsushi Hayashi, Nara, Japan

[73] Assignee: Sharp Kabushiki Kaisha, Osaka, Japan

[21] Appl. No.: 784,579

[22] Filed: Oct. 29, 1991

[30] Foreign Application Priority Data

Oct. 29, 1990 [JP] Japan ..................... 2-293138

[51] Int. Cl.[5] ........... G03G 15/04; G03B 27/36

[52] U.S. Cl. ........................ 355/233; 355/235; 355/236; 355/243; 355/58

[58] Field of Search ............ 355/233, 235, 243, 236, 355/57, 58

[56] References Cited

U.S. PATENT DOCUMENTS

| | | | |
|---|---|---|---|
| 4,077,715 | 3/1978 | Greene | 355/57 |
| 4,095,880 | 6/1978 | Shrogren et al. | 355/57 X |
| 4,142,793 | 3/1979 | Schilling | 355/235 X |
| 4,487,497 | 12/1984 | Kimura et al. | 355/243 |
| 4,540,273 | 9/1985 | Tamura | 355/235 |
| 4,582,418 | 4/1986 | Kozuka et al. | 355/235 |

FOREIGN PATENT DOCUMENTS 62-203147 9/1987 Japan .

*Primary Examiner*—Joan H. Pendegrass
*Assistant Examiner*—P. J. Stanzione
*Attorney, Agent, or Firm*—David G. Conlin; Robert F. O'Connell

[57] ABSTRACT

An optical unit including a lens and a mirror unit installed within an image forming apparatus, the lens and mirror unit moving together according to a desired power of magnification so as to expose a photoconductor to the light reflected from the original to form an image corresponding to the desired magnification, wherein the optical unit includes a cam device for moving the mirror unit, the cam device including a cam which is connected to a driving source and rotates according to the various power of magnification, and a cam follower which moves around the cam to reciprocate the mirror unit; and a lock means on the circumferential surface of the cam, the lock means engaging the cam follower to prevent the mirror unit from moving when a specific variable power of magnification is selected.

10 Claims, 3 Drawing Sheets

OPTICAL UNIT

BACKGROUND OF THE INVENTION

1. Field of the Invention

The present invention relates to an optical unit installed within an image forming apparatus so as to expose a photoconductor to the light reflected from the original to form an image of variable magnification.

2. Description of the Prior Art

In an exposure process in a copying machine light is emitted from a light source to an original set on a platen made of transparent glass. The light reflected from the original is further reflected in the direction opposite to scan by a first mirror moving together with the light source as one unit in a direction to scan, further reflected through an upper second mirror and a lower third mirror in a direction to scan, after which the light reflected from the third mirror is guided through a lens to be reflected in the direction opposite to scan by a mirror unit comprising an upper fourth mirror and a lower fifth mirror. Finally, a photoconductor is exposed to the reflected light by a reflecting mirror provided in the optical path of this reflection light.

In such a copying machine, the change in a copy magnification, i.e., variable power is performed by reciprocating the lens and the mirror unit mentioned above in the direction to scan and the opposite direction thereto mentioned above.

FIG. 3 and FIG. 4 show one example of mirror units of this kind. A fourth mirror 10 and a fifth mirror 11 are contained in a mirror case 13 to compose a mirror unit 1. This mirror unit 1 is disposed on an optical bench plate 2 so that the mirror unit may reciprocate in the direction shown by the arrow D and the direction opposite thereto. This movement is performed by sliding a slide portion 14 provided on the longitudinal edge of the mirror case 13, and the movement of the slide portion 14 is guided by a slide guide shaft 15.

When a mirror unit 1 having such a structure is installed in a copying machine and carried, if a shock is inflicted on the mirror unit 1, the mirror unit 1 is likely to move, thereby spoiling the installation accuracy thereof, or causing troubles such as breakage. Then, in the conventional example mentioned above, when carrying the unit, the mirror case 13 and a metal fitting 16 provided at the position of the optical bench plate 2 facing the back of the mirror case 13 are fastened by a screw 17, which prevents the mirror unit 1 from moving while being carried, thereby protecting the mirror unit 1.

However, the conventional method for protecting the mirror unit mentioned above has required a complicated process for fastening a screw in a final finishing process in the production of a copying machine on the part of manufacturers, which has hampered the improvement of productivity.

On the other hand, there has also been required a process for releasing the screw when a copying machine is installed on the part of users. However, since the screw-fastening portion presents within a copying machine, the process for releasing the screw must be achieved with the outer case of the copying machine dismantled, which has caused a deficiency that a long period of time is required for the installation thereof.

SUMMARY OF THE INVENTION

The optical unit of this invention, which overcomes the above-discussed and numerous other disadvantages and deficiencies of the prior art, comprises a lens and a mirror unit installed within an image forming apparatus, said lens and said mirror unit moving according to a desired power of magnification so as to expose a photoconductor to the light reflected from the original to form an image corresponding to the desired magnification, wherein the optical unit comprises, a cam device for moving the mirror unit, the cam device including a cam which is connected to a driving source and rotates according to various magnifications, and a cam follower which moves around the cam to reciprocate the mirror unit; and a lock means on the circumferential surface of the cam, the lock means engaging the cam follower to prevent the mirror unit from moving when a specific power of magnification is selected.

In a preferred embodiment, the optical unit further comprises a means for guiding the movement of a lens carriage holding the lens.

In a preferred embodiment, the guide means comprises a slide plate formed on the lens carriage and a rail which guides the slide plate so that the slide plate may freely slide.

In a preferred embodiment, the optical unit further comprises a means for moving the lens carriage is connected to the lens carriage, and a mechanism for moving a wire stretched over many rollers.

In a preferred embodiment, one of the many rollers is a driving roller connected to the output shaft of a motor.

In a preferred embodiment, a position sensor to detect the position of the lens carriage is provided on the lens carriage.

In a preferred embodiment, the position sensor comprises a photoelectric sensor provided on the lens carriage and a slit provided within the range in which the lens carriage may move.

In a preferred embodiment, the optical unit further comprises a spring for always pressing the cam follower against the circumferential surface of the cam.

In a preferred embodiment, the lock means is a lock groove formed on a part of the circumferential surface of the cam.

In a preferred embodiment, the lens carriage is driven by the same driving source as the mirror unit.

According to the present invention, the rotation of a cam changes the distance between the center of the cam and a cam follower in contact with the circumferential surface of the cam, which moves the mirror unit connected to the cam follower. That is, the variation in the radius of the cam moves the mirror unit, which enables the power of magnification to change in an image forming apparatus into which this optical unit is installed. When the cam continues to rotate until a specific power of magnification is selected, a locking means provided on the cam engages the cam follower, thereby locking the mirror unit. The mirror unit which has been locked as above described can be released, for example, by rotating the cam in the opposite direction.

Therefore, the complicated processes for fastening a screw and releasing it which have been required in the prior art mentioned above are not required. This may improve the production efficiency of an image forming apparatus in which such an optical unit is installed, and largely reduce the time required for installment thereof.

In addition, the number of parts such as a screw can be reduced.

Thus, the invention described herein makes possible the objective of providing an optical unit which can improve the production efficiency of image forming apparatuses such as a copying machine and reduce the time required for installation thereof.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

The present invention is described by reference to an example below.

Figure 1:
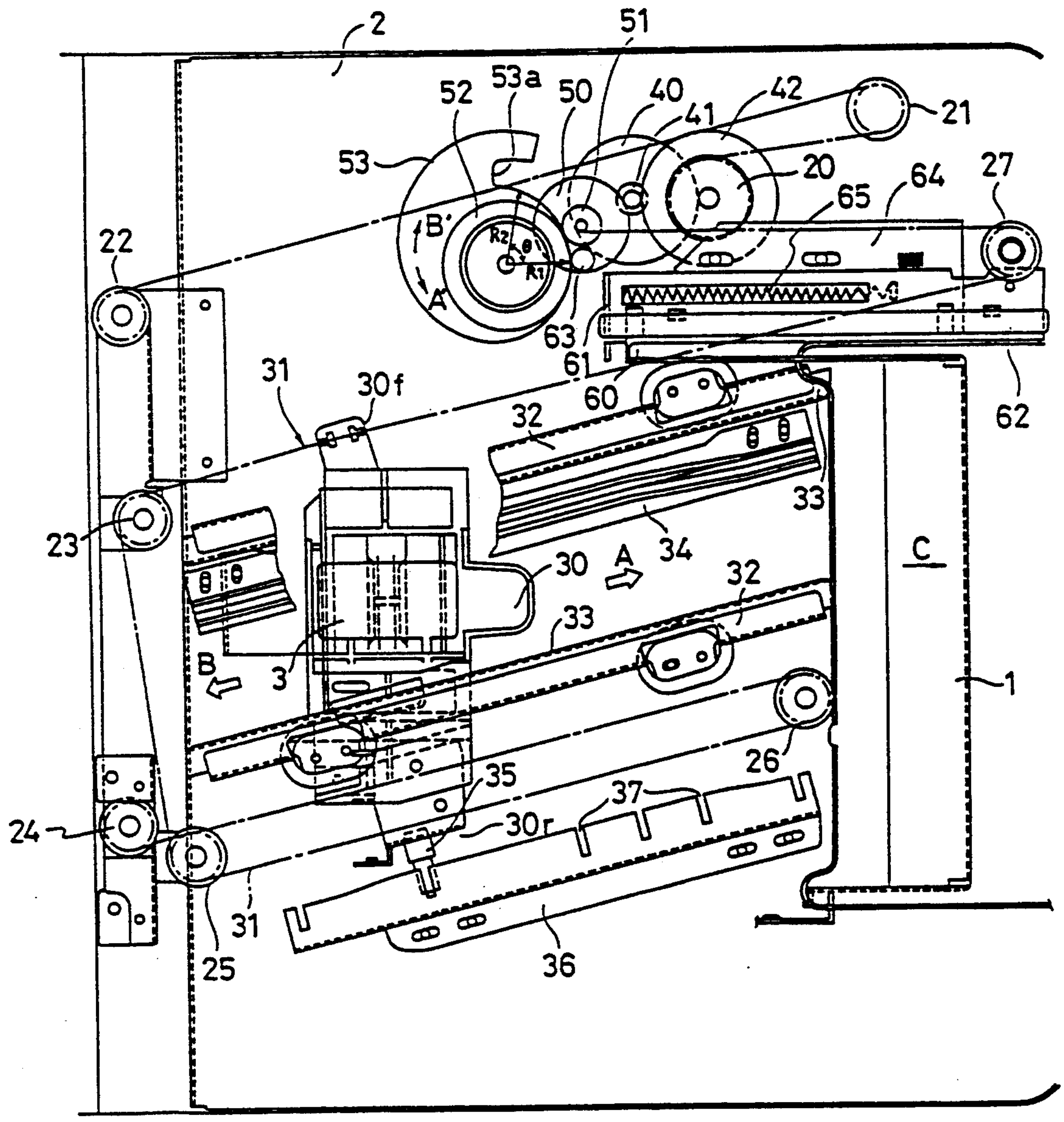
FIG. 1 is a top view showing the whole structure of an optical unit of the present invention.

FIG. 1 is a top view showing the whole structure of an optical unit of the present invention. A lens 3 and a mirror unit I including a pair of mirrors corresponding to the fourth mirror and the fifth mirror mentioned above are combined together as an integral part to form this optical unit. With this optical unit installed in a copying machine, when the lens 3 and the mirror unit 1 are moved in the transverse direction of the copying machine, the copy magnification is set according to the amount of the movement thereof.

First, how the lens 3 is installed and moves are described. The lens 3 is fixed on a lens carriage 30 in the shape of a hollow rectangle from the top view thereof. A wire 31 for moving the lens 3 is connected to the front edge 30*f* and the rear edge 30*r* of the lens carriage 30. The wire 31 is stretched over seven slave rollers 21 to 27 each disposed at the front, rear, right, and left positions of the optical unit from the top view thereof. When the driving roller 20 rotates, the portion connected to both the front and rear edges 30*f* and 30*r* of the lens carriage 30 reciprocates in the directions shown by arrows A and B, which moves the lens 3 fixed on the lens carriage 30.

The driving roller 20 is rotated by a motor 40. That is, a pinion 41 is connected to the output shaft of the motor 40. A gear 42 provided concentrically with the driving roller 20 engages the pinion 41. Therefore, the reciprocating rotation of the motor 40 causes the driving roller 20 to rotate forward and backwards accordingly, which reciprocates the lens 3.

A rail 32 in the shape of C channel from the cross sectional view thereof and a slide plate 33 held between the side walls of the channel in the rail 32 are attached on both front and rear edges of the underside side of the lens carriage 30. The lens 3 is guided by this rail 32, and therefore it can smoothly move upward and downward without any lost motion. Further, the lens 3 is smoothly guided in the horizontal direction without any lost motion by a lens guide 34 with grooves extending in the direction shown by the arrows A and B.

A lens position sensor 35 which detects the position of the lens 3 is provided on the front edge of the lens carriage 30. The lens position sensor 35 is composed of, for example, a transmissive type photoelectronic sensor, and detects the position of a slit 37 formed on a slit plate 36 provided within the range in which the lens position sensor 35 may move, thereby detecting the position of the lens 3. The movement of the lens 3 is determined by the copy magnification set by an operator.

Next, the moving mechanism of the mirror unit 1 is described. The pinion 41 of the motor 40 engages a deceleration gear 50. A cam driving gear 52 engages an intermediate gear 51 concentrically held with the decelerating gear 50. A power varying cam 53 is connected to the cam driving gear 52. Therefore, when the motor 40 is driven, the power varying cam 53 rotates with a predetermined deceleration ratio with respect to the rotating rate of the motor 40 through the pinion 41, the deceleration gear 50, the intermediate gear 51, and the cam driving gear 52.

Figure 2:
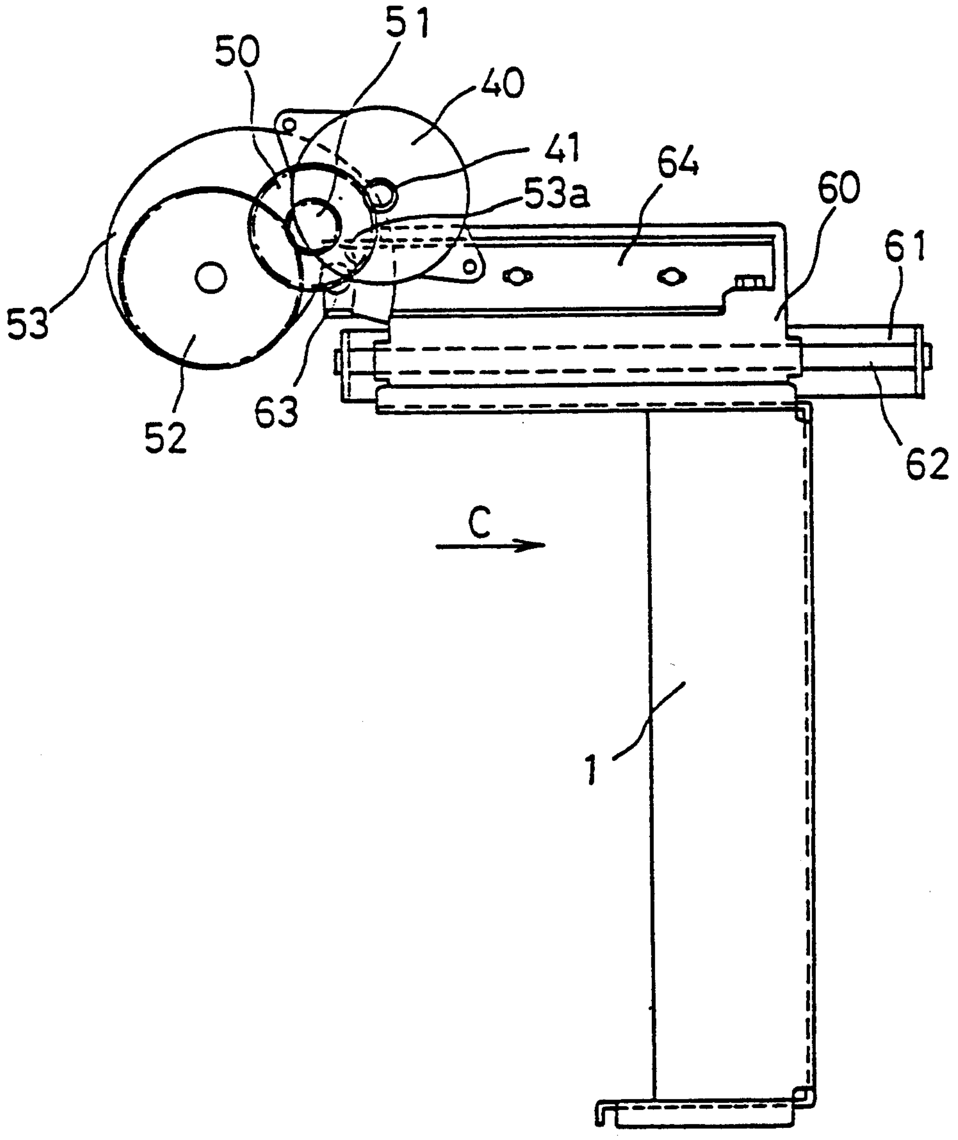
FIG. 2 is a partial top view showing the mirror unit which is being locked.
Figure 3:
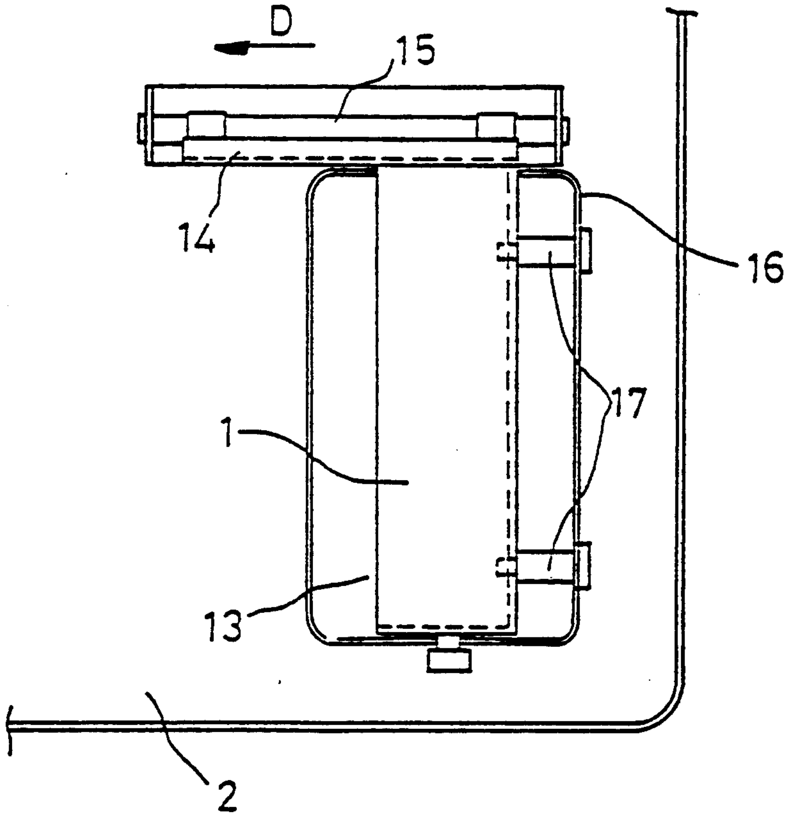
Fig. 3 PRIOR ART
FIG. 3 is a top view showing an example of conventional mirror units.
Figure 4:
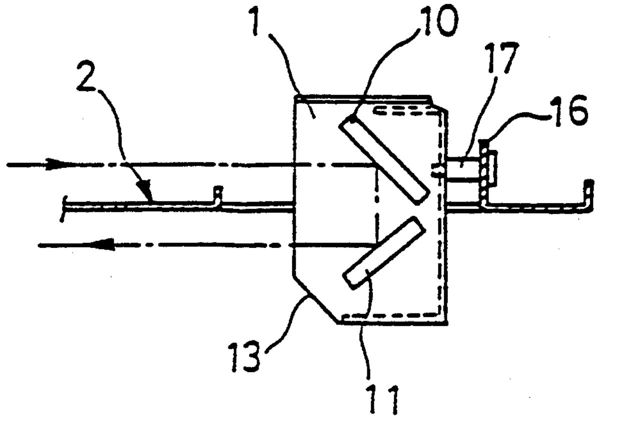
Fig. 4 PRIOR ART
FIG. 4 is a transverse cross section of the example shown in FIG. 3.

On the other hand, as shown in FIG. 2, a slider 60 which is in the shape of a rectangle from the top view thereof is connected to the rear edge of the mirror unit 1. The mirror unit reciprocates in the direction of an arrow C and the direction opposite thereto through the slider 60. The slider 60 is guided by a slide shaft 62 mounted on the optical bench plate 2 through a slide shaft holder 61. That is, a part of the slider 60 engages the slide shaft 62.

Further, a mounting plate 64 which holds a follower 63 in the shape of a ball is connected to the left side of the slider 60. The follower 63 is always pressed against the circumferential surface of the power varying cam 53 by a compressive spring 65, and moves around the power varying cam 53 while being pressed. Thus, a cam device is so constructed that the power varying cam 53 drives the follower 63.

According to such a cam device, the mirror unit 1 reciprocates in the directions of the arrow C and opposite thereto corresponding to the movement of the lens 3. That is, the motor 40 drives the lens 3 through the transmission path mentioned above. When the power varying cam 53 which is decelerated by the deceleration gear 50 according to the amount of the movement of the lens 3 rotates only by the predetermined angle $\theta$, the mirror unit 1 reciprocates only by the difference in radius (R2-R1) of the power varying cam 53.

In this movement, the power varying cam 53 rotates counterclockwise, i.e., a direction shown by an arrow A' corresponding to the movement of the lens 3 in the direction of the arrow A, while the cam 53 rotates clockwise, i.e., the direction shown by an arrow B' corresponding to the movement of the lens 3 in the direction of B.

As described above, the mirror unit 1 is only pressed against the circumferential surface of the power varying cam 53 by the compressive spring 65, and is, therefore, in a free state, i.e., exerts no force with respect to the direction shown by the arrow C. However, as shown in FIG. 2, when the power varying cam 53 rotates into the position shown in FIG. 2, the follower 63 engages a lock groove 53*a* formed on a part of the circumferential surface of the cam 53. Thus, the lock groove 53*a* and the follower 63 are locked with each other, which prevents the mirror unit 1 from unexpectedly moving in the direction of the arrow C even when outer force in the direction of the arrow C is exerted on the mirror unit I. Therefore, even when a shock is exerted on the optical unit when it is in transit, the optical unit can be effectively protected.

The position at which the lock groove 53*a* is formed may be selected according to the specific copy magnification (variable power). This may improve the production efficiency and reduce the time required for installation for the following reasons.

In a final finishing process of the production on the part of manufacturers, if a specific copy magnification is selected, the mirror unit 1 is automatically locked. On the other hand, in an installation process on the part of users, if the main power source is set on, the lens 3 and the mirror unit 1 are initialized, and then the power varying cam 53 rotates in a direction such that the follower 63 and the lock groove 53*a* are released from each other, automatically releasing the locked parts.

In the above example, the lens 3 and the mirror unit 1 are moved by the same driving source, but can be moved by different driving sources. However, the use of the same driving source for moving the lens 3 and the mirror unit 1 results in a further compact structure of the optical unit.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An optical unit comprising a lens and a mirror unit installed within an image forming apparatus, the lens and the mirror unit moving according to a desired power of magnification so as to expose a photo-conductor to the light reflected from the original to form an image corresponding to the desired magnification, wherein the optical unit comprises, a cam device for moving the mirror unit, the cam device including a cam which is connected to a driving source and rotates according to the various magnifications, and a cam follower which moves around the cam to reciprocate the mirror unit; and a lock means on the circumferential surface of the cam, the lock means operative to engage the cam follower to prevent the mirror unit from moving when the optical unit is to be moved.

2. An optical unit according to claim 1, further comprising a means for guiding the movement of a lens carriage holding the lens.

3. An optical unit according to claim 2, wherein the guide means comprises a slide plate formed on the lens carriage and a rail which guides the slide plate so that the slide plate may freely slide.

4. An optical unit according to claim 2, wherein a means for moving the lens carriage is connected to the lens carriage, and a mechanism for moving a wire stretched over a plurality of rollers.

5. An optical unit according to claim 4, wherein one of the a plurality of rollers is a driving roller connected to the output shaft of a motor.

6. An optical unit according to claim 2, wherein a position sensor to detect the position of the lens carriage is provided on the lens carriage.

7. An optical unit according to claim 6, wherein the position sensor comprises a photoelectric sensor provided on the lens carriage and a slit provided within the range in which the lens carriage may move.

8. An optical unit according to claim 1, further comprising a spring for always pressing the cam follower against the circumferential surface of the cam.

9. An optical unit according to claim 1, wherein the lock means is a lock groove formed on a part of the circumferential surface of the cam.

10. An optical unit according to claim 2, wherein the lens carriage is driven by the same driving source as the mirror unit.

* * * * *